United States Patent Office

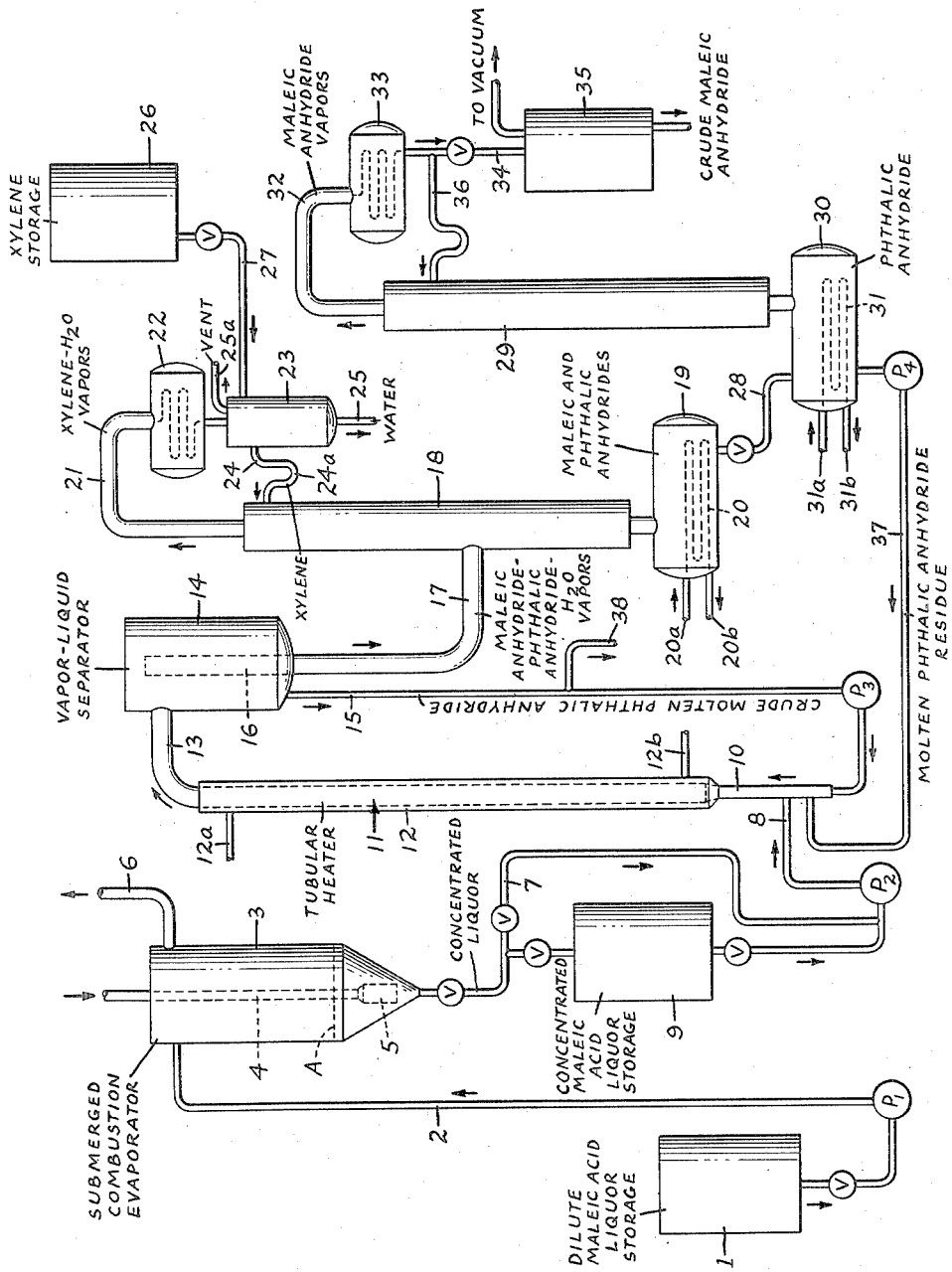

2,770,630
Patented Nov. 13, 1956

2,770,630

RECOVERY OF MALEIC ANHYDRIDE

Stuart P. Miller, Scarsdale, N. Y., assignor to Allied Chemical & Dye Corporation, New York, N. Y., a corporation of New York Application March 12, 1952, Serial No. 276,082

7 Claims. (Cl. 260—346.8)

This invention relates to the production of maleic anhydride and more specifically to its recovery from dilute aqueous liquors containing maleic acid, or maleic and phthalic acids. More particularly the invention concerns a novel process for the recovery of maleic anhydride and also phthalic anhydride from waste liquors containing maleic and phthalic acids, obtained in the production of phthalic anhydride by catalytic oxidation of hydrocarbons.

In the manufacture of phthalic anhydride by catalytic oxidation of aromatic hydrocarbons such as naphthalene in accordance with processes such as that described in U. S. P. 2,071,357 to Porter, a maleic acid effluent liquor containing comparatively small proportions of maleic and phthalic acids is obtained, usually predominating in the maleic acid constituent. Such dilute aqueous maleic and phthalic acid-containing solutions heretofore generally have been sewered because of the difficulty involved in processing them to recover the maleic and phthalic acid values thereof. This difficulty to a large extent is brought about by the tendency of maleic acid in these solutions to invert to fumaric acid during dehydration of the maleic acid content of the solution to maleic anhydride. However, due to the large tonnage of phthalic anhydride annually produced by processes similar to that of the above-noted Porter patent, disposal of the waste liquor effluent from these processes has posed a substantial pollution problem and, further, has represented considerable economic loss of the maleic as well as the phthalic acid contents thereof. While attempts have been made in the past to subject the above waste liquors to processing in order to recover particularly maleic anhydride from the relatively low maleic acid content thereof, these attempts have been generally unsuccessful because of the excessive recovery costs involved.

U. S. Patent 1,424,138 discloses subjecting maleic acid, in the form of a concentrated water solution thereof, to distillation with xylene, drawing over with the solvent the uncombined water present in the crude maleic acid and the combined water thereof, and leaving maleic acid in the still. Such procedure, however, involves prolonged heating of the liquid maleic acid solution at a comparatively high temperature with resultant conversion of a portion of the maleic acid to fumaric acid.

It is an object of this invention to recover maleic anhydride from mixtures containing maleic anhydride or maleic acid, and water. Another object is to concentrate aqueous solutions containing maleic acid with minimum inversion of the maleic acid content to fumaric acid. Another object is the recovery of maleic anhydride from dilute aqueous solutions containing maleic acid. Yet another object is to provide a process for recovering maleic and phthalic anhydrides, particularly the former, from dilute aqueous liquors containing maleic and phthalic acids. The chief aim of the invention is the provision of economic procedure for recovery of maleic anhydride in good yield and with minimum fumaric acid formation, from the maleic acid content of waste liquors also containing phthalic acid, such liquors being obtained from the catalytic oxidation of hydrocarbons, e. g. aromatic hydrocarbons such as naphthalene.

Other objects and advantages will be apparent as the description of the invention proceeds.

I have found, according to one important aspect of the invention, that water may be readily removed from a vaporous mixture containing maleic anhydride and water, and maleic anhydride recovered with minor inversion thereof to fumaric acid, by introducing such vaporous mixture into a still column through an inlet in the side thereof, introducing one or more hereinafter defined organic substances into said column, distilling out as overhead vapors a mixture of water and said substance or substances, and obtaining as residue maleic anhydride. The vaporous mixture containing maleic anhydride and water may be secured by heating or flash vaporizing aqueous solutions of maleic acid, e. g. those resulting from the catalytic oxidation of benzene, or aqueous solutions of maleic acid which also include phthalic acid, under conditions to minimize formation of fumaric acid. Where solutions of maleic and phthalic acids are thus employed, the vaporous mixture secured may also contain phthalic anhydride, and on distillation of such mixture in the aforesaid manner, the still residue may contain a mixture of both maleic and phthalic anhydrides.

The substances or agents with which the above vaporous mixtures containing maleic anhydride may be distilled for removal of water therefrom, include generally alkylated benzenes boiling within the range 135° to 175° C. Representative compounds of this type which may be employed are trimethyl, methyl ethyl and propyl benzenes, and xylenes, the latter being preferred. These alkylated benzenes are miscible at their boiling point with maleic and phthalic anhydrides, immiscible with water and readily separable therefrom, and are inert to maleic and phthalic anhydrides, water and steel used in the construction of the distillation equipment. These water removal agents may be utilized separately or in mixtures, and generally function to withdraw water from the anhydrides by forming an azeotrope with the water, which azeotrope is distilled off as a vapor.

In accordance with one embodiment of the invention, it has been found that maleic anhydride may be recovered from a dilute aqueous liquor containing maleic acid and phthalic acid by concentrating said liquor by evaporation of water under conditions to minimize formation of fumaric acid, flash vaporizing the resulting concentrate to dehydrate a substantial proportion of the maleic acid and phthalic acid and to form a vapor effluent containing maleic anhydride and water, feeding at least a portion of said vapor effluent into a distillation zone in contact with xylene, distilling water and xylene out of said zone in the form of a water-xylene azeotrope, condensing maleic anhydride out of the vapors in said distillation zone and recovering said maleic anhydride as product. When operating in this manner, the invention process is generally carried out by mixing the above maleic-phthalic acid concentrate with molten phthalic anhydride, passing the mixture rapidly through a dehydrating zone at a temperature of 170–250° C. to convert a substantial proportion of the maleic acid and phthalic acid content of said mixture to the corresponding anhydrides with minimum fumaric acid production, separating a liquid effluent containing phthalic anhydride and the above noted vapor effluent containing maleic anhydride and water vapor and treating the vapor effluent as above indicated for the recovery of maleic anhydride. By practice of the invention, high recoveries of the maleic acid values of the above dilute liquors are obtainable in the form of commercially valuable maleic anhydride in an economic manner while at the same time avoiding pollution of streams or other similar disposal facilities into which such liquors have heretofore been dumped.

While aqueous liquors or solutions containing varying proportions of maleic and phthalic acids are applicable as starting material in the foregoing embodiment of the invention, liquors having a total solids content of the order of 25% or less are generally utilized. The process is of particular value for processing the waste maleic acid-containing liquors obtained as effluent in the manufacture of phthalic anhydride by catalytic oxidation of hydrocarbons. Hence, for convenience, the invention process will be hereinafter described mostly in terms of the use of such waste liquors, also referred to herein as phthalic anhydride mother liquor, as starting material, although it is to be understood that the invention is not to be taken as limited in the application of such waste liquors thereto.

In a preferred mode of operation, the process of this invention comprises the following steps: (1) concentration of phthalic anhydride mother liquor, desirably to between 50% and 60% by weight total solids, (2) formation of a mixture of the concentrate with crude molten phthalic anhydride, (3) combined flash evaporation of water from the mixture and dehydration of the maleic and phthalic acid content thereof, (4) recycling of liquid effluent containing phthalic anhydride by mixing with the mother liquor concentrate, (5) introduction of vapor effluent containing maleic and phthalic anhydrides and water into a column to which xylene is also fed, (6) separation of overhead vapors as a water-xylene azeotrope and recycling of xylene back to the column, (7) condensation of the anhydride vapors in the column to form a mixture of maleic and phthalic anhydrides as still bottoms, (8) separation of maleic anhydride as product from the still bottoms by distillation, and (9) recycling of the still residue comprising crude phthalic anhydride by mixing with the mother liquor concentrate prior to dehydration thereof.

For a more complete understanding of the invention, reference may be had to the accompanying drawing illustrating diagrammatically an apparatus for carrying out the process.

Numeral 1 represents a dilute maleic acid liquor storage tank having a valved outlet connected to a pump $P_1$ discharging into a conduit 2 which leads to a submerged combustion evaporator 3. The evaporator employed herein is similar to that shown and described in U. S. P. 2,159,759 to Doennecke et al., and comprises a combustible gas feed pipe 4, a burner 5 near the bottom of the evaporator and arranged so that during operation it is submerged below the surface A of the fluid being evaporated, and a gas vent pipe 6. Application of such an evaporator in the herein described process not only provides good agitation of the liquor and economy of operation, but has another important advantage particularly as regards evaporation of water from maleic acid-containing liquors in accordance with the invention, as will be hereinafter more fully described.

The bottom of the submerged combustion evaporator has a valved outlet having connection with conduit 7 leading to pump $P_2$ which discharges into conduit 8 for conveying concentrated liquor to a mixing conduit 10. Conduit 7 also is connected to the top of a storage tank 9, the bottom of which contains a valved outlet for passage of liquid to pump $P_2$ for discharge into conduit 8 and mixing conduit 10. Accordingly, liquid maleic acid-containing concentrate from evaporator 3 may be stored prior to being fed to mixing conduit 10, or, if desired, storage tank 9 may be by-passed and the concentrate conveyed directly through lines 7 and 8 into mixing conduit 10 by means of pump $P_2$.

The top of conduit 10 is connected to the bottom of a vertically positioned narrow tubular heater or flash dehydrator 11 having a heating jacket 12 containing inlet 12a and outlet 12b for heating fluid such as superheated steam or oil. The maleic acid-containing mixture entering the dehydrator is rapidly circulated therein from the bottom to the top. A connection 13 conveys exiting liquid and vapor from tubular heater 11 to a vapor-liquid separator 14 having a vertical pipe 15 extending downwardly from the bottom of the separator, said pipe being provided with a pump $P_3$ and being connected at its lower extremity with mixing conduit 10. A vapor conduit 16 extends centrally from the bottom of vapor-liquid separator 14 into the interior and close to the top thereof. Conduit 16 is attached to a pipe 17 connected in turn to about the center of a packed distillation column 18, for conveying vapors from the separator into the column. If desired, a plate column may be employed in place of a packed column.

Located at the bottom of column 18 is a reboiler 19 having coils 20 for circulation of heating fluid, e. g. steam, and heating fluid inlet 20a and outlet 20b. Column 18 has an outlet line 21 in its top for conveying xylene and water vapors from the column into the top of condenser 22, the bottom of which is attached to a separator 23 for separation of xylene from water. The separator is connected near its top to one end of a xylene return line 24 having a liquid seal 24a, the other end of line 24 being attached to column 18. A water outlet 25 is provided in the bottom of separator 23 and a vent line 25a is fixed to the top thereof. Numeral 26 represents a xylene storage tank provided with a valved outlet line 27 connected to separator 23 near its top.

A valved conduit 28 is connected at one end to reboiler 19 and at the other end to a still 30 having coils 31 for circulation of heating fluid by means of inlet 31a and outlet 31b. Positioned above still 30 and connected thereto is a fractionating column 29 to the top of which is attached a vapor outlet line 32 in turn connected to a condenser 33. A valved pipe connection 34 leads from the bottom of condenser 33 to a maleic anhydride receiver 35, and a line 36 having a liquid seal connects pipe 34 with column 29 for return of reflux thereto. Conduit 37 having a pump $P_4$ connects still 30 with mixing conduit 10, to convey molten phthalic anhydride-containing residue from the still for recycling and mixing with mother liquor concentrate in conduit 10. A draw-off line 38 is provided in connection with conduit 15 to enable impurities and excess phthalic anhydride to be removed from the system at various intervals or continuously. Columns, pumps and lines which contain the anhydrides in the form of vapor or liquid may be insulated and/or steam-jacketed or otherwise heated, in accordance with good engineering practice. For example, in addition to tubular heater 11, conduits 10, 15, 37 and 38, and vapor-liquid separator 14 should be jacketed for accommodating heating fluid or furnished with other types of heating equipment, to avoid undue cooling of their liquid contents.

The waste phthalic anhydride mother liquor advantageously employed as starting material in the invention process generally contains not more than 25% solids comprising chiefly maleic acid and phthalic acid, predominantly maleic, with some other materials including tars. For example, a typical phthalic anhydride mother liquor which may be employed herein may contain about 12% maleic acid and about 4% phthalic acid (16% total solids) by weight. In spite of the low solubility of phthalic acid in water, this material as well as the maleic acid are both present in solution in the above waste liquors, with some insoluble tars and other materials usually in suspension therein. The high dissolved phthalic acid content of such liquors (of the order of ten times equilibrium concentration) probably is due to the inhibiting effect of tars on crystallization of phthalic acid from solution.

Phthalic anhydride mother liquor is fed from storage tank 1 to the submerged combustion evaporator 3. If desired, the mother liquor may be filtered prior to transfer to the evaporator in order to remove insolubles such as tars. In the submerged combustion evaporator, the mother liquor is concentrated to 30–70% solids by weight, usually to 40–65% solids content. By employment of the submerged combustion evaporation technique, one of the important features of the instant process, the mother liquor undergoes concentration, under approximately atmospheric pressure, at a comparatively low temperature generally in the range 90–110° C., thus effecting evaporation under conditions whereby substantially no inversion of maleic acid to fumaric acid takes place. In usual operation at atmospheric pressure, the submerged combustion evaporator is maintained at a temperature of about 95° C. It has been found that aqueous solutions of maleic and phthalic acids can be concentrated to as high as 85% solids in this manner without formation of fumaric acid. While submerged combustion evaporation is the preferred mode of concentrating the liquor employed as starting material herein, low temperature vacuum concentration may be employed as a less desirable alternative. Preliminary concentration of the mother liquor in accordance with the process is desirable in order to obtain high conversion of the maleic acid content of the mother liquor to maleic anhydride product. Exhaust gases from the submerged combustion evaporator contain chiefly steam with small amounts of other substances which may include nitrogen, carbon dioxide and phthalic and maleic acids and their anhydrides. Such gases are vented through pipe 6 and may be discarded or passed to a recovery unit.

The concentrated mother liquor may then be transferred directly to the mixing conduit 10 or it may first be conveyed to the concentrate storage tank 9 wherein the liquid concentrate may be kept at comparatively high temperatures of say 80–90° C. preparatory to use. Preferably the concentrated liquor is used as rapidly as possible to avoid its becoming pasty, thus making its handling difficult. Prior to introduction of the concentrated liquor into the mixing conduit 10, such liquor may be filtered to again remove insolubles such as tar. Unfiltered material may be handled satisfactorily provided the solids content of the liquor concentrate is not greater than 45 to 50% and the concentrate is kept hot during transfer to the conduit 10 or is stored hot for not more than about one hour before use. Hot concentrates on storage for more than about an hour deposit tarry material that does not go back into solution and hence, such concentrates if stored, are desirably filtered prior to feeding to mixing conduit 10.

On entrance of the concentrated mother liquor into conduit 10, the concentrate is mixed therein with crude molten phthalic anhydride. The rate of flow of the concentrate into conduit 10 in proportion to that of the phthalic anhydride therein, is such that a mixture of these materials containing a substantial proportion of the phthalic anhydride is obtained. Usually, the operation is carried out so that this mixture contains phthalic anhydride in major proportions, say in the neighborhood of at least ten times by weight of the concentrate, and more satisfactory results have been secured by mixing the concentrate with a proportion of phthalic anhydride on the order of about 100 times by weight of the concentrate. By effecting the subsequent decomposition of the maleic acid content of the concentrate to maleic anhydride with the maleic acid in relatively dilute solution in molten phthalic anhydride, the concomitant conversion of maleic acid to fumaric acid may be reduced. Further, the phthalic anhydride serves to maintain any tarry residue from the mother liquor concentrate in a fluid condition.

Once the process is in operation the major portion of the molten phthalic anhydride mixed with the concentrate in conduit 10, is preferably supplied by recycling the anhydride, in crude form, from subsequent stages of the process, as will be hereinafter more fully described. However, a portion of such molten phthalic anhydride may be freshly added from an outside source. The temperature of the molten phthalic anhydride mixed with the concentrate in conduit 10, is preferably such that the resulting mixture has a temperature close to that maintained in flash dehydrator or tubular heater 11, in order to minimize the amount of additional heating required in the dehydrator and to thus lower the time required for passage of the solution therethrough. Accordingly, the temperature of the phthalic anhydride-liquor concentrate mixture in conduit 10 may approach 170° C. or more, e. g. 200° C.

The mixture of phthalic anhydride and concentrated mother liquor is then passed rapidly through the dehydrator or tubular heater 11 wherein a substantial proportion of the maleic acid and phthalic acid content of the mixture is converted to the corresponding anhydrides. The operation is carried out employing a minimum period of contact of the mixture in the dehydrating zone so as preferably to convert the major proportion of the maleic and phthalic acids in the mixture to the corresponding anhydrides while at the same time obtaining minimum fumaric acid production under the prevailing temperature conditions in the dehydrator. The mixture is heated in the flash dehydrator to a temperature of 170–250° C., and for best operation involving substantially complete suppression of fumaric acid formation at these temperatures, it has been found that the residence time of the mixture in the dehydrator should be not more than one second. Best yields of maleic anhydride are obtainable if the concentrated liquor-phthalic anhydride mixture enters the dehydrator at a temperature of 170° to 200° C., and if the temperatures attained in the dehydrator are somewhat higher, preferably 225° to 250° C.

During passage of the molten phthalic anhydride-concentrate mixture through the dehydrator, the free water present in the liquid concentrate, as well as the water formed by decomposition of the maleic and the phthalic acids in the mixture, is vaporized as is also the maleic anhydride and some of the phthalic anhydride produced by such decomposition. It is noted that in general practice where the quantity of phthalic anhydride diluent in the mixture treated in the dehydrator is more than ten times the amount of mother liquid concentrate in such mixture, the total amount of water therein requiring evaporation in order to produce maleic anhydride is comparatively small, and such evaporation can be accomplished under the conditions noted above despite the short period of contact of the mixture in the dehydrator. If the phthalic anhydride mother liquor is not concentrated prior to its admixture with molten phthalic anhydride in conduit 10, a substantial proportion of the maleic acid in the mixture will not be decomposed in the dehydrator to maleic anhydride vapor, thus lowering the yield of the latter finally recovered as product.

The effluent stream of material from the dehydrator 11 containing maleic anhydride, phthalic anhydride, water, small amounts of maleic and phthalic acids and residue, is then fed into the vapor-liquid separator 14. The temperature in the separator is about the same as that in the dehydrator, although generally slightly lower if the separator is not heated. The liquid portion formed in the separator contains chiefly phthalic anhydride together with some tars and maleic and phthalic acids, and a small amount of fumaric acid and maleic anhydride. Up to 90% or more of phthalic anhydride may be present in the liquid in the separator. This liquid effluent is withdrawn from the vapor-liquid separator and is recycled through conduit 15, back to the mixing conduit 10 for admixture with fresh incoming concentrated mother liquor prior to its introduction into the tubular heater or dehydrator. In ordinary practice of the instant process, the liquid effluent containing crude phthalic anhydride recycled from the vapor-liquid separator 14 contributes the major portion, e. g. as much as 90% or more, of the molten phthalic anhydride added as diluent to the mother liquor concentrate.

The vapors liberated in the vapor-liquid separator consist chiefly of maleic anhydride, phthalic anhydride and water. In the operation of the invention process involving the use of a mother liquor concentrate-containing feed to the dehydrator, the effluent vapor stream from the separator may, for example, contain on the order of three parts maleic anhydride to two parts phthalic anhydride. On the other hand, use of a dilute mother liquor without prior concentration for introduction into the dehydrator with mixed phthalic anhydride provides a vapor effluent from the separator which may contain substantially less maleic anhydride than phthalic anhydride, thus resulting in lower recovery of maleic anhydride.

The vapors leave the separator at a temperature of about 165–240° C., usually about 165–225° C., and are introduced into the middle of the packed column 18 simultaneously with introduction of the organic azeotroping agent, e. g. liquid xylene preferably at a temperature of about 70° C., into the top of the column through line 24. The xylene or like material is vaporized by contact with the hot incoming anhydride-containing vapors and distills out as overhead through conduit 21, carrying with it the water present in such vapors in the form of a water-xylene azeotrope. This azeotrope is condensed in condenser 22 and the condensate permitted to separate into xylene and water layers in separator 23. The water is removed and the xylene is recycled as reflux to the top of the column. Material condensed in the column, comprising essentially a mixture of phthalic and maleic anhydrides, is collected in reboiler 19. The liquid contents of the reboiler are maintained during distillation at a temperature of 180–220° C. Temperature of the xylene reflux is not critical, but is generally such that the vapors at the top of the column are at about 90–110° C.

The xylene or other azeotroping agent used in the fractionating column serves to remove water and thus prevent its recombination with phthalic and maleic anhydrides to form the corresponding acids, on condensation of the anhydrides in the column. Under the conditions described herein, the system is operated so that substantially no maleic or phthalic anhydride is carried over with the xylene-water azeotrope. Reboiler temperatures must be kept sufficiently high to insure a boil-up of azeotroping agent, as well as of maleic and phthalic anhydrides, thus preventing the entry of liquid water into the reboiler and consequent blockage of the column with solid acids.

The above-described feature of introducing vapors containing maleic anhydride and water, with or without phthalic anhydride, directly into the xylene azeotroping column for removal of water from the vapor mixture and condensation of the anhydrides, constitutes a particularly essential feature of the invention process. Such feature avoids the necessity for first condensing the vapor mixture, thereby producing maleic acid by recombination of the water with the maleic anhydride, and then subjecting the condensed maleic acid to distillation in the presence of the azeotroping agent, e. g. xylene, as disclosed in above mentioned U. S. Patent 1,424,138. In addition to avoiding an intermediate maleic acid condensation step, the invention procedure, involving introduction of maleic anhydride along with water as vapors into the azeotroping column, accordingly prevents loss of maleic acid to fumaric acid by decomposition during removal of water at this stage, due to substantial absence of maleic acid during this distillation step.

If desired, a partial condenser may be inserted between the vapor-liquid separator 14 and the distillation column 18 for condensation of the major portion of phthalic anhydride present in the vapors leaving the separator. Material thus condensed may be recycled by introduction into mixing conduit 10.

The above-described conditions, with respect to temperature, etc., maintained in the submerged combustion evaporator 3, dehydrator 11, vapor-liquid separator 14 and azeotroping column 18 are based on operations at approximately atmospheric pressure. However, other pressures may be utilized provided corresponding operating temperatures are not substantially outside the ranges previously noted.

The contents of reboiler 19 including essentially maleic and phthalic anhydrides, predominantly the former, according to preferred procedure, are then passed into still 30 to effect separation of maleic anhydride from phthalic anhydride. The fractionating column 29 associated with the still is operated at subatmospheric pressure, e. g. about 100 mm. absolute, while maintaining the temperature of the liquid contents of the still 30 at between about 140 and 220° C. with corresponding column temperatures of 100° to 150° C. Most of the phthalic anhydride is separated here as residue, and drains to the still 30. Such residue containing crude molten phthalic anhydride is recycled by means of conduit 37 and mixed with fresh mother liquid concentrate in conduit 10.

However, the molten phthalic anhydride furnished in this manner for admixture with the mother liquor concentrate in accordance with the principles of the invention, constitutes only a minor proportion of the total phthalic anhydride diluent employed for this purpose. In one embodiment of the process described above, involving admixture of a total of about 100 parts of crude molten phthalic anhydride with about one part of mother liquor concentrate in conduit 10, only about 3% of such phthalic anhydride is furnished by recycling the residue from still 30, the major portion, about 97%, of the molten phthalic anhydride diluent being secured by recycling and mixing the liquid effluent from the vapor-liquid separator 14 with the mother liquor concentrate.

From time to time, a portion of the crude phthalic anhydride residue containing tars and other contaminants accumulated in the system is removed through draw-off line 38. While such removal may be done intermittently, continuous removal of at least a portion of the phthalic anhydride residue is preferable in order to minimize variations in material composition in the various stages of the process. Ordinarily, withdrawal of such residue from the system takes place at a rate equal to that of accumulation from the mother liquor. However, where the mother liquor is particularly contaminated, residue removal may be more rapid, fresh phthalic anhydride being added to compensate for any resulting decrease in the quantity of phthalic anhydride recirculated through conduit 10 and dehydrator 11 as diluent for the mother liquor concentrate. The phthalic anhydride residue thus withdrawn may be processed in a suitable manner, e. g. by chemical treatment and/or distillation, to recover the phthalic anhydride values as product.

The overhead vapors in the above fractionation step are condensed in condenser 33 to form crude maleic anhydride. In accordance with the instant process employing dilute phthalic anhydride mother liquor as starting material, the recovery of crude maleic anhydride may exceed 90% and may be as high as 95% based on the maleic acid content of such liquor. The crude maleic anhydride produced by the process of the invention may be sent to storage or further purified in order to obtain a product of satisfactory color. A product of high purity may be obtained by fractional distillation of the crude maleic anhydride or by chemical treatment, for example with sulfuric acid. The final product may be processed to any suitable form, for example, flakes, chips, grains or briquettes.

The various steps of the invention process may be carried out intermittently, or some may be practiced intermittently and some continuously, or the process as a whole operated continuously, the last mode of procedure being preferred for best operating conditions and economy. However, in some cases it may be desirable for instance to operate the submerged combustion evaporator intermittently, storing some of the liquor concentrate thus produced, and to carry out the other steps continuously.

The following are examples of operation of the invention process, quantities being expressed in parts by weight unless otherwise specified:

*Example 1.*—8,000 parts of aqueous phthalic anhydride mother liquor, containing by weight 14.4% maleic acid and 2.5% phthalic acid, with small amounts of dissolved tar, were concentrated in a submerged combustion evaporator operating at 92°–96° C. and atmospheric pressure to yield about 2,070 parts of concentrate and about 5,930 parts of distillate. The concentrate analyzed 54.7% maleic acid, 9.3% phthalic acid and 36% water, by weight. The distillate consisted of 0.3% by weight maleic acid, 0.1% phthalic acid, and 99.6% water.

A flash-type still was charged with 100 parts of phthalic anhydride and heated by a surrounding oil bath at 300° C. A feed consisting of about 1,990 parts of concentrate prepared as described above was fed to this still at a rate of 8 to 10 parts per minute. During the operation the flash still had an internal temperature of 225°–250° C.

The vapors from the flash still consisting essentially of maleic and phthalic anhydrides and water, were introduced into the side of an azeotrope column which was operating at reflux on an initial charge of 100 parts of phthalic anhydride and 150 parts of o-xylene. The column was heated externally from the feed point to the still at the base of the column by an electric heater and was insulated from the feed point to the condenser. The condenser was equipped with a special decanter for returning liquid xylene to the column as reflux and for separating off condensed water.

During operation of the above azeotrope column, 924 parts of water were taken from the condenser, containing 0.9% maleic acid and no phthalic acid, the temperature at the head of the column being maintained within the range 95–110° C. At the end of the run the bottoms in the azeotrope column were distilled at a pressure of 74 mm. Hg absolute, recovering as distillate 135 parts of o-xylene and 846 parts of maleic anhydride (equivalent to about 1,000 parts of maleic acid), and 429 parts of residue which contained 368 parts of phthalic anhydride (equivalent to 414 parts phthalic acid). Of the maleic acid present in the dilute phthalic anhydride mother liquor starting material, about 92% was recovered as maleic anhydride product, and less than 3% was converted to fumaric acid in the process.

*Example 2.*—An aqueous maleic acid solution containing about 49.2% by weight of maleic acid was treated to recover maleic anhydride utilizing the same apparatus as that described in Example 1, except that concentration of the solution was not carried out. The flash-type still was heated to an internal temperature of 200°–215° C. by the surrounding oil bath at 250° C. The feed to the flash still, consisting of 553 parts of the maleic acid solution, was added to the still at a rate of approximately 3 parts per minute.

The vapors from the flash still were introduced into the side of the azeotrope column which was operating at reflux on an initial charge of 100 parts of phthalic anhydride and 150 parts of o-xylene. During the operation of the column, 385 parts of water were taken from the condenser, containing about 0.2% total acid calculated as maleic acid, the temperature at the head of the column being maintained within the range 95–110° C. At the end of the run the bottoms in the azeotrope column were distilled at a pressure of 74 mm. Hg absolute, recovering as distillate 127 parts of o-xylene and 164 parts of maleic anhydride (equivalent to 194 parts of maleic acid) and 119 parts of residue which contained 91 parts of phthalic anhydride (equivalent to 102 parts phthalic acid). Of the maleic acid content of the aqueous maleic acid starting material, 71% was recovered as maleic anhydride product.

*Example 3.*—About 100 pounds of phthalic anhydride mother liquor, containing by weight 12% maleic acid, 5.4% phthalic acid, 0.3% tar and about 82% water, were filtered to separate solids and tar. The filtrate was then subjected to submerged combustion evaporation at a temperature of 92°–96° C. and about atmospheric pressure and filtered, the resulting concentrate containing by weight 41.3% maleic acid, 9.0% phthalic acid, 1% tar, and 48.7% water. During evaporation, water vapor (containing about 0.2% maleic acid and 0.1% phthalic acid) was vented.

At a feed rate of approximately 2 gallons per hour, the above concentrate was pumped into a circulating stream of 75 pounds molten phthalic anhydride. The mixture was heated in a flash dehydrator maintained at 2 to 4 p. s. i. gauge pressure by saturated steam at about 180 p. s. i. gauge pressure, to a temperature of 175°–180° C. The vapors formed consisted of about 21.6% by weight maleic anhydride, 22.6% phthalic anhydride, and 55.8% water. The liquid effluent from the dehydrator comprised essentially crude phthalic anhydride containing maleic anhydride and maleic acid in an amount of 8%, calculated as maleic acid, and some tar and fumaric acid. The liquid effluent was withdrawn intermittently, at a rate of about 20 pounds every 4 hours. Fresh phthalic anhydride was charged to the dehydrator intermittently, at a rate of about 25 pounds every 4 hours.

The exit vapors from the flash dehydrator, after separation from the liquid effluent, were introduced at a temperature of about 175°–180° C. into a packed column maintained at atmospheric pressure, in contact with liquid xylene. The xylene distilled out of the column together with the water as a water-xylene azeotrope, and this overhead was condensed to form a water layer containing about 0.5% maleic acid and a xylene layer which was recycled to the column. The maleic and phthalic anhydrides introduced into the column were condensed and collected in a still pot at the base of the column, the pot being maintained at a temperature of 195° C., with a corresponding temperature at the head of the column of 95°–110° C.

The still bottoms, consisting of about 50% by weight maleic anhydride and 50% phthalic anhydride, were then fractionated in a 10-plate column batch still at a reflux ratio of about 2 to 1. Pressure in this still was maintained at 90–100 mm. Hg absolute, with a still pot temperature of 140°–200° C. Crude maleic anhydride was obtained as distillate in an amount corresponding to a yield of about 70%, based on the maleic acid content of the phthalic anhydride mother liquor. This crude product was redistilled to obtain a product of more satisfactory color. The still residue from the above fractionation, consisting of about 88% phthalic anhydride, some maleic anhydride, and some fumaric acid, was used to replenish the dehydrator with circulating molten pthalic anhydride.

When the temperature in the flash dehydrator was maintained between 225° and 250° C., the yield of crude maleic anhydride product obtained was increased to about 90%, based on the maleic acid content of the phthalic anhydride mother liquor.

From the foregoing, it is apparent the process of the invention is of great commercial value for recovery in good yield of maleic and phthalic anhydrides, particularly the former, from the maleic and phthalic acid contents of aqueous solutions of these acids, and especially of dilute aqueous phthalic anhydride mother liquors obtained as effluent in production of phthalic anhydride by oxidation of aromatic hydrocarbons, which liquors heretofore have generally been sewered.

Since various changes and modifications may be made in the invention without departing from the spirit thereof, the invention is to be taken as limited only by the scope of the appended claims.

I claim:
1. The process of recovering maleic anhydride from a dilute aqueous liquor containing maleic acid and phthalic acid which comprises concentrating said liquor by submerged combustion evaporation of water at 90–110° C., whereby formation of fumaric acid is minimized, mixing the resulting concentrate with a large excess by weight of molten phthalic anhydride, passing the molten mixture rapidly through a dehydrating zone at a temperature of 170–250° C. to convert a substantial proportion of the maleic acid and phthalic acid content of said mixture to the corresponding anhydrides with minimum fumaric acid production, separating a liquid effluent containing phthalic anhydride and a vapor effluent containing maleic anhydride and water vapor, feeding at least a portion of said vapor effluent at a temperature of 165–240° C. into a distillation zone in contact with an alkylated benzene selected from the group consisting of trimethyl, methyl ethyl and propyl benzenes and xylenes, distilling water and said alkylated benzene out of said zone in the form of a water-alkylated benzene azeotrope, condensing maleic anhydride out of the vapors in said distillation zone and recovering said maleic anhydride as product.

2. The process as defined in claim 1 wherein said liquor is a waste liquor obtained from the production of phthalic anhydride by catalytic oxidation of hydrocarbons, said liquor containing not more than 25% solids comprising chiefly maleic acid and phthalic acid, predominantly the former, and wherein said liquor is concentrated to 30–70% solids.

3. The process of recovering maleic anhydride from a dilute aqueous liquor containing maleic acid and phthalic acid, said liquor containing not more than 25% solids comprising chiefly maleic acid and phthalic acid, predominantly the former, which comprises concentrating said liquor to a solids content of 30–70% by submerged combustion evaporation at 90–110° C., whereby formation of fumaric acid is minimized, mixing the resulting concentrate with at least 10 times its weight of molten phthalic anhydride while maintaining the mixture at a temperature of at least 170° C., passing the mixture at a temperature of 170–250° C. rapidly through a dehydrating zone to convert the major portion of the maleic acid and phthalic acid content of said mixture to the corresponding anhydrides with minimum fumaric acid production, separating from the resulting mixture a vapor effluent containing vapors of maleic anhydride, phthalic anhydride and water, feeding said vapor effluent at a temperature of 165–240° C. into a distillation zone in contact with xylene vapor, removing water and xylene from said zone in the form of a water-xylene azeotrope, condensing maleic anhydride and phthalic anhydride as residue out of the vapors in said distillation zone, separating maleic anhydride from said residue and recovering said maleic anhydride as product.

4. The process of recovering maleic anhydride from an aqueous liquor obtained from the production of phthalic anhydride by catalytic oxidation of hydrocarbons, and containing not more than 25% solids comprising chiefly maleic acid and phthalic acid, predominantly the former, which comprises concentrating said liquor to 30–70% solids by submerged combustion evaporation at 90–110° C. to minimize formation of fumaric acid, mixing the resulting concentrate with at least 10 times its weight of molten phthalic anhydride, passing the mixture in not more than one second through a dehydrating zone at a temperature of 170–250° C. to convert a major portion of the maleic acid and phthalic acid content of said mixture to the corresponding anhydrides with minimum fumaric acid production, introducing the exit stream into a liquid-vapor separation zone, withdrawing a vapor effluent containing vapors of maleic anhydride, phthalic anhydride and water, feeding said vapor effluent at 165–240° C. into a distillation zone in contact with xylene, removing water and xylene from said zone in the form of a water-xylene azeotrope, condensing the remaining vapors in said distillation zone to form as residue a molten mixture containing maleic and phthalic anhydrides, maintaining said condensate at 180–220° C., separating maleic anhydride from said residue and recovering said maleic anhydride as product.

5. The process of recovering maleic anhydride in good yield from a waste aqueous liquor obtained in the production of phthalic anhydride by catalytic oxidation of hydrocarbons, said liquor containing not more than 25% solids comprising chiefly maleic acid and phthalic acid, predominantly the former, which comprises concentrating said liquor to 40–65% solids by submerged combustion evaporation at 90–110° C. to minimize formation of fumaric acid, mixing the resulting concentrate with at least 10 times its weight of crude molten phthalic anhydride, passing the mixture rapidly through a dehydrating zone at a temperature of 225°–250° C. to convert the maleic acid and phthalic acid content of said mixture substantially to the corresponding anhydrides with minimum fumaric acid production, introducing the exit stream into a liquid-vapor separation zone, withdrawing a liquid effluent containing chiefly crude molten phthalic anhydride and a vapor effluent containing vapors of maleic anhydride, phthalic anhydride and water, recycling and mixing said liquid effluent with said concentrate, feeding said vapor effluent at 165–225° C. into a distillation zone in contact with xylene vapor, heating the liquid contents of said distillation zone to 180–220° C. to distill water and xylene out of said zone in the form of a water-xylene azeotrope, condensing the remaining vapors in said distillation zone to form as residue a molten mixture containing maleic and phthalic anhydrides, subjecting said mixture to fractional distillation at subatmospheric pressure to drive off maleic anhydride, leaving crude molten phthalic anhydride as still bottoms, recycling and mixing said still bottoms with said concentrate, said liquid effluent and said still bottoms furnishing substantially the entire amount of the crude molten phthalic anhydride added to said concentrate, and recovering maleic anhydride as product.

6. The process as defined in claim 5 wherein said waste liquor contains about 12% by weight maleic acid and about 4% by weight phthalic acid, the total amount of crude molten phthalic anhydride added to said concentrate is on the order of about 100 times by weight thereof, the major portion of said phthalic anhydride being furnished by said liquid effluent, the temperature of the resulting mixture being 170° to 200° C.

7. The process of concentrating an aqueous solution containing maleic acid with minimum inversion of said maleic acid to fumaric acid, which comprises subjecting said aqueous solution to submerged combustion evaporation at 90–110° C.

References Cited in the file of this patent

UNITED STATES PATENTS

| | | |
|---|---|---|
| 1,917,391 | Othmer | July 11, 1933 |
| 2,076,033 | Kniskern | Apr. 6, 1937 |
| 2,159,759 | Doennecke et al. | May 23, 1939 |
| 2,205,402 | Foster et al. | June 25, 1940 |
| 2,462,444 | Weiss | Feb. 22, 1949 |

FOREIGN PATENTS

| | | |
|---|---|---|
| 633,814 | Great Britain | Dec. 30, 1949 |